(12) United States Patent
Watkins, Sr.

(10) Patent No.: US 6,324,765 B1
(45) Date of Patent: Dec. 4, 2001

(54) WEED TRIMMER GUARD

(76) Inventor: Gary J. Watkins, Sr., 15329 Cedar, Arcadia, TX (US) 77517

( * ) Notice: Subject to any disclaimer, the term of this patent is extended or adjusted under 35 U.S.C. 154(b) by 0 days.

(21) Appl. No.: 09/398,254

(22) Filed: Sep. 21, 1999

(51) Int. Cl.$^7$ .................................................. B26B 7/00
(52) U.S. Cl. ................... 30/276; 30/277; 30/278
(58) Field of Search ................. 30/276, 277, 278

(56) References Cited

U.S. PATENT DOCUMENTS

| Re. 34,358 | * | 8/1993 | Miller ............................ 30/296.1 |
| 4,370,909 | * | 2/1983 | Jennings ............................ 83/457 |
| 4,447,953 | * | 5/1984 | Iombardino et al. .................. 30/382 |
| 4,467,686 | * | 8/1984 | Pyle ................................ 83/478 |
| 4,651,422 | | 3/1987 | Everts . |
| 4,756,084 | * | 7/1988 | Morita ............................ 30/276 |
| 5,077,898 | * | 1/1992 | Hartwig ............................ 30/276 |
| 5,115,870 | | 5/1992 | Byrne . |
| 5,228,276 | | 7/1993 | Miller . |
| 5,371,977 | * | 12/1994 | Liner ............................ 451/349 |
| 5,402,627 | | 4/1995 | Trompler et al. . |
| 5,423,126 | * | 6/1995 | Byrne ............................ 30/276 |
| 5,477,665 | * | 12/1995 | Stout ............................ 56/16.7 |
| 5,524,349 | * | 6/1996 | Dolin ............................ 30/276 |
| 5,584,348 | | 12/1996 | Butler . |
| 5,657,542 | | 8/1997 | White, III et al. . |
| 5,741,175 | * | 4/1998 | Voege ............................ 451/455 |
| 5,924,205 | * | 7/1999 | Sugihara et al. ................. 30/276 |
| 5,926,961 | * | 7/1999 | Uhl ............................ 30/296.1 |

* cited by examiner

Primary Examiner—M. Rachuba
(74) Attorney, Agent, or Firm—Kenneth L Tolar

(57) ABSTRACT

A guard for a weed trimmer includes an elongated telescoping arm attachable to a trimmer shaft. The arm is biased in an extended position. Pivotally attached to a distal end of the arm is a protector plate for providing a protective barrier between a trimmer head and another object such as a tree trunk, plant or fence. The distance between the plate and trimming head can be selectively varied by pressing the plate against the object.

8 Claims, 3 Drawing Sheets

WEED TRIMMER GUARD

BACKGROUND OF THE INVENTION

The present invention relates to a device which may be attached to a weed trimmer shaft to protect tree trunks, wooden fences and similar objects from being damaged by a weed trimmer line.

DESCRIPTION OF THE PRIOR ART

Weed trimmers are used to cut grass, weeds and similar unwanted vegetation around sidewalks, trees, fences and other confined areas that a lawn mower cannot reach. A conventional weed trimmer typically includes a head having a line that is rapidly rotated to cut the unwanted vegetation. However, the line must often be positioned near fences, tree trunks, flowers, shrubbery and similar fragile objects which can be severely or fatally damaged if contacted by the line. The present invention overcomes the above described problems associated with conventional weed trimmers by providing a device attachable to the weed trimmer shaft that provides a protective barrier between the cutting line and an object. Various guards and weed trimming accessories exist in the prior art. For example, U.S. Pat. No. 5,657,542 issued to White, III et al. relates to a trimmer having an improved trimmer head including a spool having a core with ribs thereon. The design prevents contraction of the line from warping or otherwise damaging the spool.

U.S. Pat. No. 5,584,348 issued to Butler relates to a guard for a weed trimmer. The guard includes an arcuate ring fastened at each end to opposing sides of the trimmer housing. The ring in combination with the trimmer housing forms a completely circular horizontal guard around the periphery of the cutting circle.

U.S. Pat. No. 5,402,627 issued to Trompler et al. relates to a support ski for mounting to a line trimmer to support the trimmer above the ground.

U.S. Pat. No. 5,228,276 issued to Miller relates to an attachment for a line trimmer including a wheel that provides an edging blade.

U.S. Pat. No. 5,115,870 issued to Byrne relates to a trimmer having a guide and guard rotatably mounted inboard of the trimmer cutting head. The guide and guard provide dynamic trimmer indexing on a sidewalk edge for guiding the trimmer vertically and horizontally to form a straight turf edge.

U.S. Pat. No. 4,651,442 issued to Everts relates to a line guard for a weed trimmer designed to protect the weed trimmer operator.

Although Butler, supra, discloses a trimmer guard designed to protect surrounding vegetation, the device has several disadvantages. The device generally provides a barrier that lies in substantially the same horizontal plane as the rotating cutting line. Accordingly, objects above and below the horizontal plane may not be protected if the line deviates therefrom. In addition, the cutting head is not movable towards and away from the guard. Furthermore, the device attaches to the trimmer head with a mounting assembly which is time consuming and cumbersome. The present invention provides a vertically oriented protector plate pivotably attached to a telescoping arm that mounts directly to the trimmer shaft. The telescoping arm is spring biased in an extended position allowing a user to press the plate against a fixed object to selectively move the cutting line closer to the protector plate.

SUMMARY OF THE INVENTION

The present invention relates to a weed trimmer guard including an elongated tubular arm attachable to the trimmer shaft. The arm is formed of a plurality of telescoping sections that are spring biased in an extended position. Pivotally attached to a distal end of the arm is a transparent protector plate which is vertically oriented relative to a cutting circle. Accordingly, a weed trimmer operator can position the plate immediately adjacent tree trunks, flowers, fences and similar objects that the operator wishes to protect. The plate provides a protective barrier between the plant and the cutting line. If a user wishes to position the cutting circle closer to a fixed object, he or she simply pushes the plate there against to retract the arm. It is therefore an object of the present invention to provide a trimmer guard that protects tree trunks, flowers, fences and the like.

It is another object of the present invention to provide a weed trimmer guard that can be selectively positioned a predetermined distance from a cutting circle.

It is yet another object of the present invention to provide a weed trimmer guard that is angularly adjustable relative to a horizontal cutting circle.

Other objects, features and advantages of the present invention will become readily apparent from the following detailed description of the preferred embodiment when considered with the attached drawings and the appended claims.

DESCRIPTION OF THE PREFERRED EMBODIMENT

A weed trimmer typically includes an elongated shaft 1 having a trimmer head 2 at the lower end thereof. The trimmer head includes a cutting line 29 that is rotated to form a horizontal cutting circle that severs weeds and similar unwanted vegetation. The present invention relates to a guard for protecting surrounding objects from the trimmer line.

Figure 1:
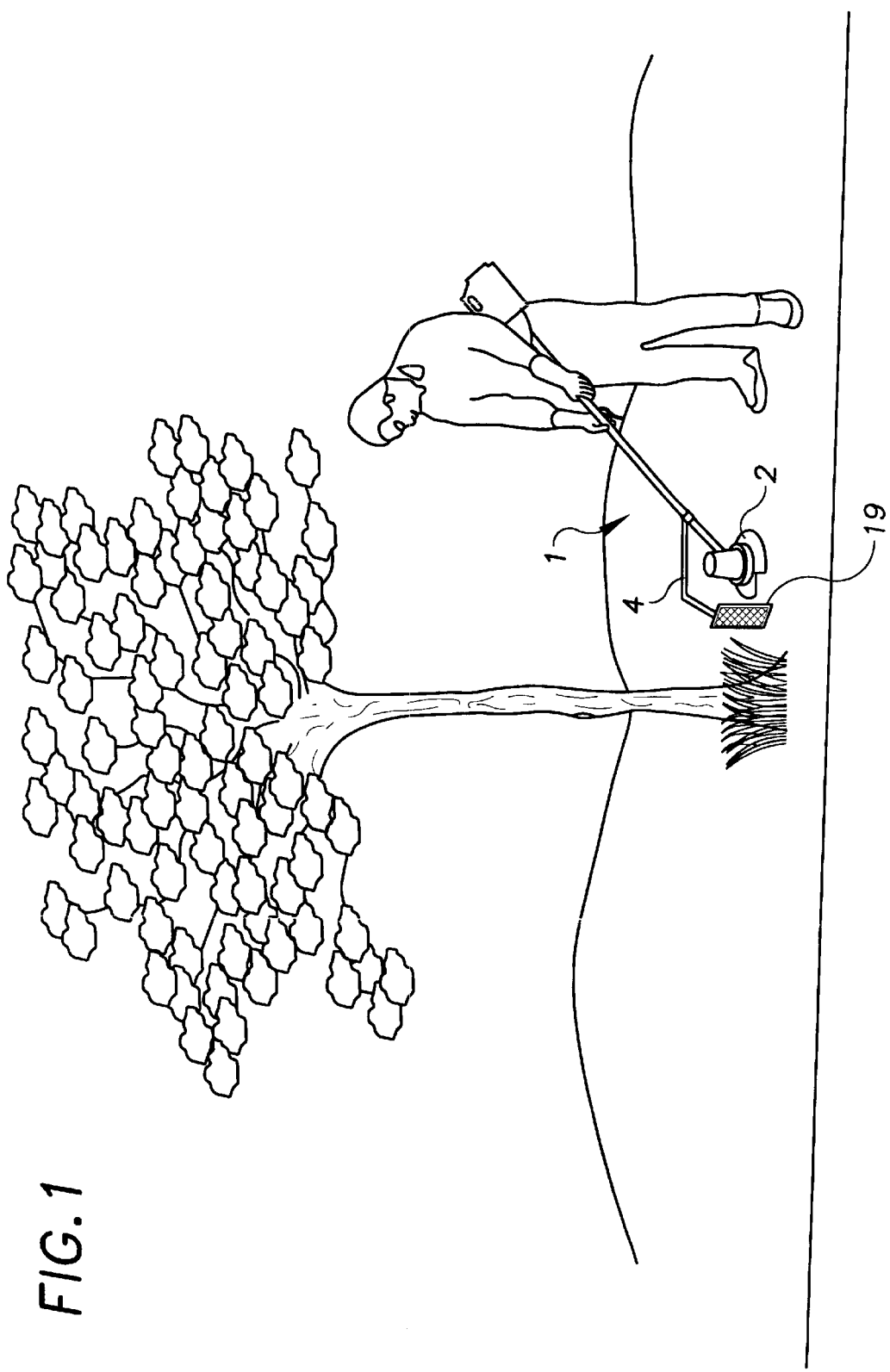
FIG. 1 depicts a user operating a weed trimmer with the guard attached thereto.
Figure 2:
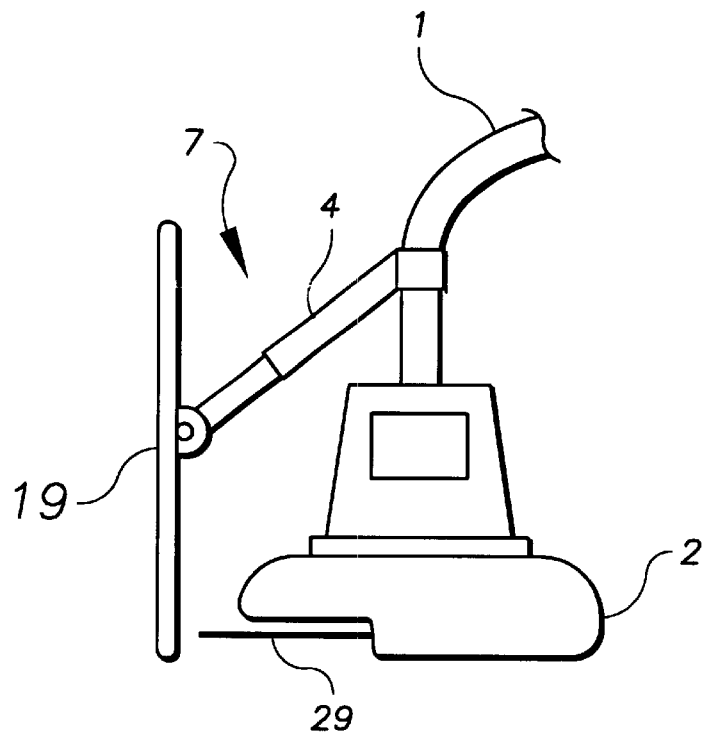
FIG. 2 is a side view of the device attached to a weed trimmer.
Figure 3:
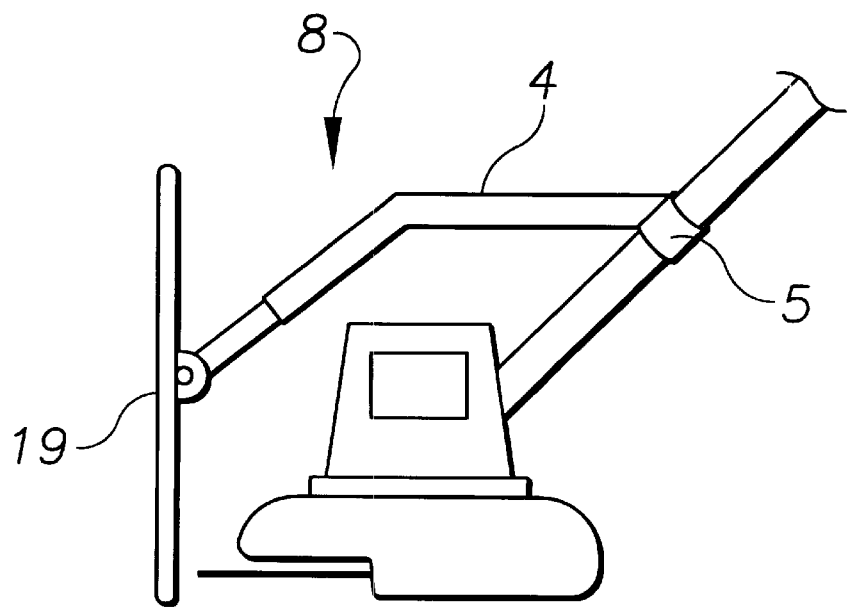
FIG. 3 is a side view of an alternative embodiment attached to a weed trimmer.
Figure 4:
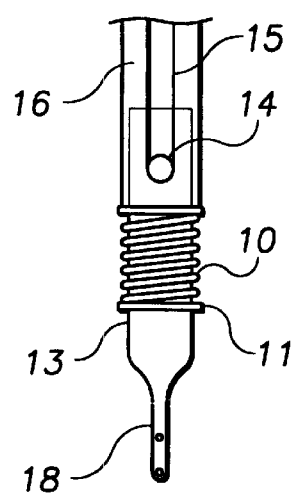
FIG. 4 is a detailed view of the telescoping arm.
Figure 5:
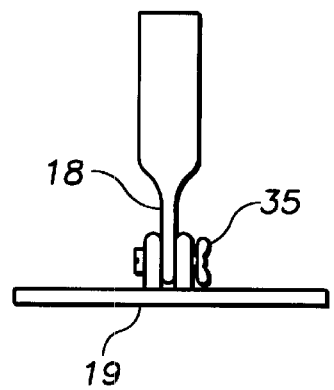
FIG. 5 is a detailed view of the tapered end of the telescoping arm attached to the protective plate.
Figure 6:
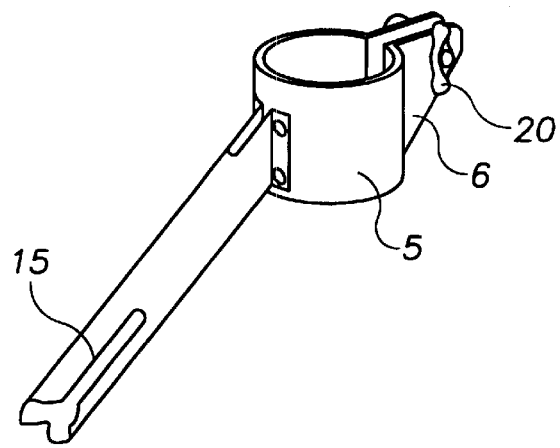
FIG. 6 is a detailed view of the clamp for attaching the telescoping arm to a trimmer shaft.

The trimmer guard according to the present invention includes an elongated, telescoping arm 4 attachable to the trimmer shaft with a clamp 5. The clamp is substantially C-shaped having a pair of flanges 6 extending therefrom, each having an aperture thereon. A screw and wing nut 20 or similar fastener means are received within the flange apertures to tighten the clamp around the trimmer shaft. As depicted in FIGS. 1 and 2, the telescoping arm may be linear 7 for use with trimmers having a curved shaft or may be bent 8 for attaching to trimmers having a straight shaft. The bent portion allows the telescoping arm to substantially circumvent the trimmer head to position a protector plate of the type described below in front of the cutting circle.

The telescoping arm is formed of two or more sections, one telescopingly received within the other. The arm is biased in an extended position with a spring 10 disposed between a pair of fixed washers 11 or flanges. An inner arm section 13 includes a guide pin 14 thereon that is slideably received within an elongated slot 15 on an outer section 16. The pin and slot prevent the two telescoping sections from separating.

At a distal end of the inner section is a tapered portion 18 having a bore therethrough. A protector plate 19 includes a pair of spaced flanges on the rear surface thereof, each having an aperture. The tapered end is positioned between the two flanges with the bore aligned with the flange apertures. A screw and nut 35 or similar fastener means is inserted through the aligned bore and apertures. Accordingly, the angular position of the plate relative to the arm may be selectively adjusted by loosening the fastener means and pivoting the plate. A user can therefore assure that the protector plate is substantially perpendicular to the cutting circle or the ground.

The protector plate is preferably constructed with a transparent, rigid material such as plexiglass allowing the trimmer operator to see therethrough. However, as will be readily apparent to those skilled in the art, the size shape, and material of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A guard for a weed trimmer having an elongated shaft and a trimmer head, said guard comprising:

an elongated arm attachable to said shaft, said arm having a distal end; said arm including a plurality of telescoping sections, said arm moveable between an extended and a retracted position;

means for biasing said arm in the extended position;

a protector plate pivotally attached to the distal end of said arm and positioned forwardly of said trimmer head to provide a protective barrier between said trimmer head and an object; said plate constructed entirely with a rigid transparent material allowing a weed trimmer operator to see therethrough.

2. The guard according to claim 1 wherein said arm is substantially linear.

3. The guard according to claim 1 wherein said arm is bent to circumvent said trimmer head.

4. The device according to claim 1 wherein said telescoping arm is formed of at least two sections, one of said sections received within the other of said section.

5. The device according to claim 4 further comprising said inner section including a tapered distal end; said tapered end having a bore therethrough;

said protector plate including a pair of space flanges on a rear surface thereof, each flange having an aperture; said tapered end of said inner section positioned between said two flanges with said bore aligned with said flange apertures;

a fastener means received within said aligned bore and apertures for securing said inner section to said plate and for allowing the angular position of said plate relative to said arm to be selectively adjusted.

6. The device according to claim 5 wherein said means for biasing said arm in an extended position comprises a spring disposed between said two arm sections to bias said arm in the extended position.

7. The device according to claim 6 wherein one of said arm sections includes a guide pin thereon that is slidably received in an elongated slot on the other of said section thereby preventing the two sections from separating.

8. The device according to claim 7 wherein said arm is secured to the trimmer shaft with a substantially C-shaped clamp.

* * * * *